United States Patent [19]

Thomas

[11] 4,198,548
[45] Apr. 15, 1980

[54] TELEPHONE SET WITH IMPROVED HOOK SWITCH MECHANISM

[76] Inventor: Wesley L. Thomas, 109 S. Catalina St., Los Angeles, Calif. 90004

[21] Appl. No.: 957,930

[22] Filed: Nov. 6, 1978

[51] Int. Cl.$^2$ .................... H04M 1/02; H04M 1/08
[52] U.S. Cl. ........................ 179/100 R; 179/159; 179/164
[58] Field of Search .......... 179/1 SW, 100 R, 100 C, 179/158 R, 159, 161, 164, 179, 178

[56] References Cited

U.S. PATENT DOCUMENTS

| | | | |
|---|---|---|---|
| 1,216,111 | 2/1917 | Gorsuch | 179/164 |
| 1,383,804 | 7/1921 | Hall | 179/164 |
| 2,895,044 | 7/1959 | Bowers | 179/158 R |
| 3,862,375 | 1/1975 | Thomas | 179/100 R |
| 4,151,467 | 4/1979 | Kongelka et al. | 179/100 R |

FOREIGN PATENT DOCUMENTS 1490091  1/1976  United Kingdom ................ 179/164

OTHER PUBLICATIONS

Advertisement; "Eureka Central Energy Apparatus", Telephony, Apr. 1902.

*Primary Examiner*—Bernard Konick
*Assistant Examiner*—Randall P. Myers
*Attorney, Agent, or Firm*—Keith D. Beecher

[57] ABSTRACT

A telephone is provided which simulates the old-fashioned crank-type of wall telephone in all respects, and yet which is constructed for modern dial or Touch-Tone operation. The telephone includes a rectangular housing which is intended to be mounted on the wall, and which has a rectangular hinged cover. The electrical components of a present-day telephone are mounted within the housing, and are connected to an old-fashioned transmitter and receiver. The transmitter is mounted on the front of the housing, and the receiver is removably supported on a pivotally mounted hook at one side of the housing. A mechanical linkage is provided which serves to couple the switching mechanism included in the present-day telephone to the hook on the side of the housing.

3 Claims, 4 Drawing Figures

TELEPHONE SET WITH IMPROVED HOOK SWITCH MECHANISM

BACKGROUND OF THE INVENTION

The old-fashioned crank-type wall telephones of the early 1920's have wide present-day popularity as antiques, and are sold as such through the country. The subject matter of U.S. Pat. No. 3,862,375 which issued to the present inventor, provides a telephone which simulates in all respcts the old-fashioned telephone, and yet which is constructed for present-day operation, without in any way changing the outward appearance of the old-fashioned telephone.

As mentioned above, the present invention is concerned with an improved, simple and rugged mechanical linkage for coupling the switching mechanism of a present-day telephone to the pivotally mounted hook which supports the old-fashioned receiver.

DETAILED DESCRIPTION OF THE ILLUSTRATED EMBODIMENT

Figure 1:
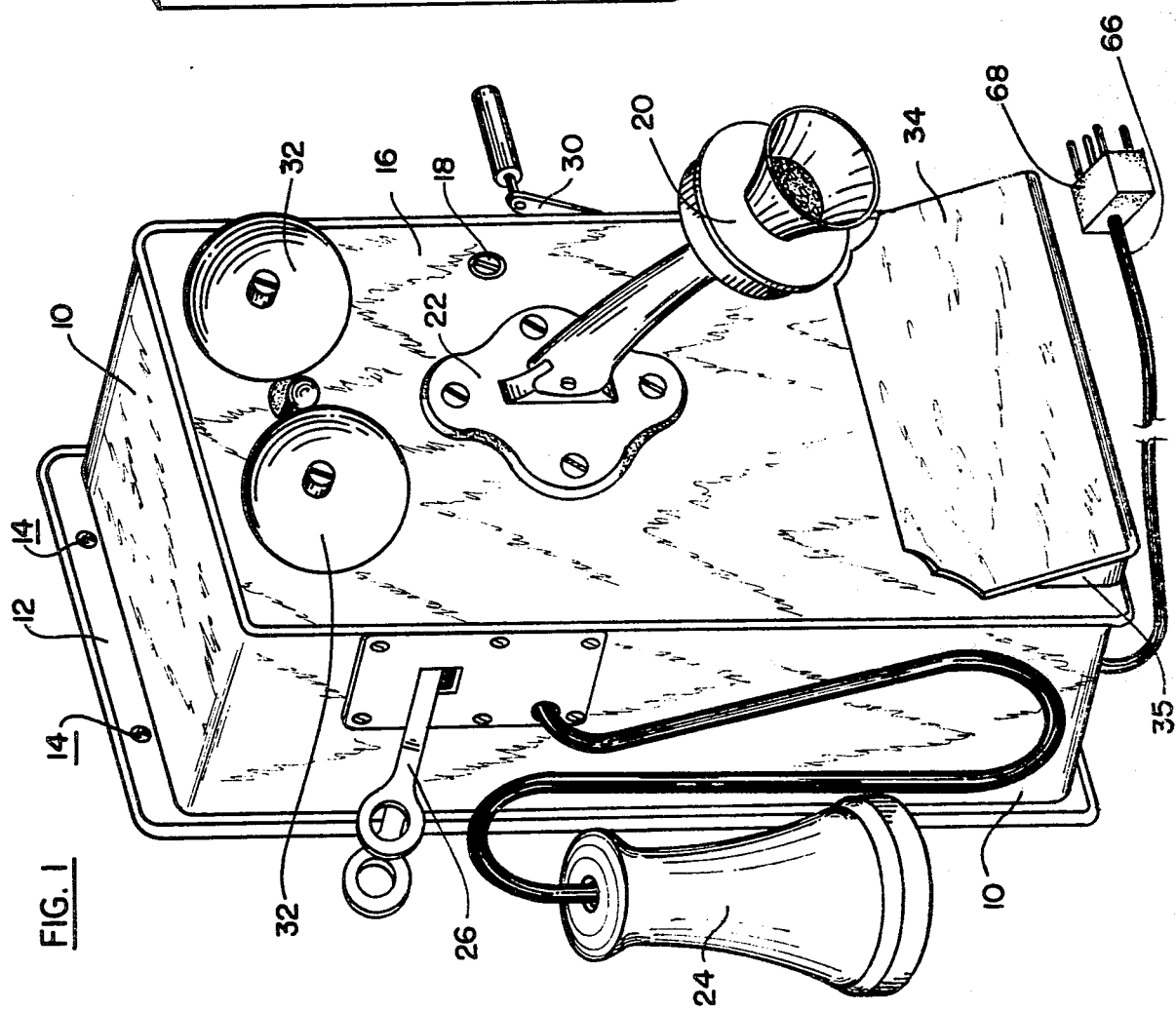
FIG. 1 is a perspective representation of the old-fashioned crank-type wall telephone which has been adapted for present-day operation and to include a mechanical linkage, in accordance with the invention.

The telephone illustrated in the drawings includes a housing 10 which has a rectangular configuration, and which is preferably formed of wood, or plastic simulating wood, so that it may have all the appearance of the old-fashioned crank-type wall telephone. The housing 10 has a rear panel 12 which is equipped with holes 14 to enable the telephone to be mounted on a vertical wall. The housing also has a front door 16 which is hinged to the housing, and which is held closed by a usual screw 18.

An old-fashioned transmitter 20 is mounted to the front door 16 by a usual old-fashioned bracket 22. An old-fashioned receiver 24 has a well known old-fashioned shape so that it may be removably supported by a pivotally mounted hook 26. A crank 30 is mounted on the opposite side of the housing 10 from the hook 26. The old-fashioned telephone bells 32 are mounted on the front door 16, in accordance with the usual construction of the type of telephone being simulated. Also, as is usual in the old-fashioned telephones of the type illustrated in FIG. 1, a shelf 34 is provided at the lower end of the door 16, the shelf being mounted on an angular bracket 35.

Figure 2:
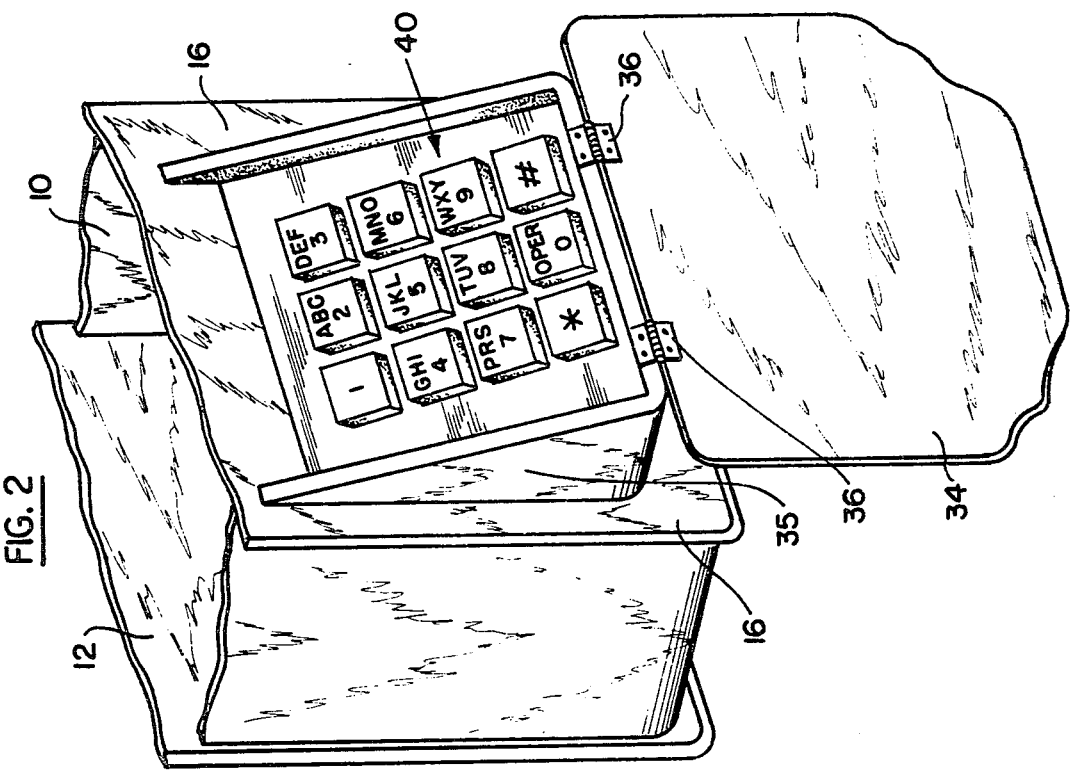
FIG. 2 is a fragmentary view of the telephone of FIG. 1, and showing a shelf component turned down to reveal a normally hidden modern Touch-Tone telephone control unit.

As best shown in FIG. 2, the shelf 34 is hinged to the bracket 35 by means of a pair of hinges 36, and it may be turned down, such as shown in FIG. 2, to permit access to a modern telephone Touch-Tone unit 40, or equivalent dial, which is mounted on the bracket 35. The unit 40 is inclined to the vertical, as shown, to facilitate its use.

Figure 3:
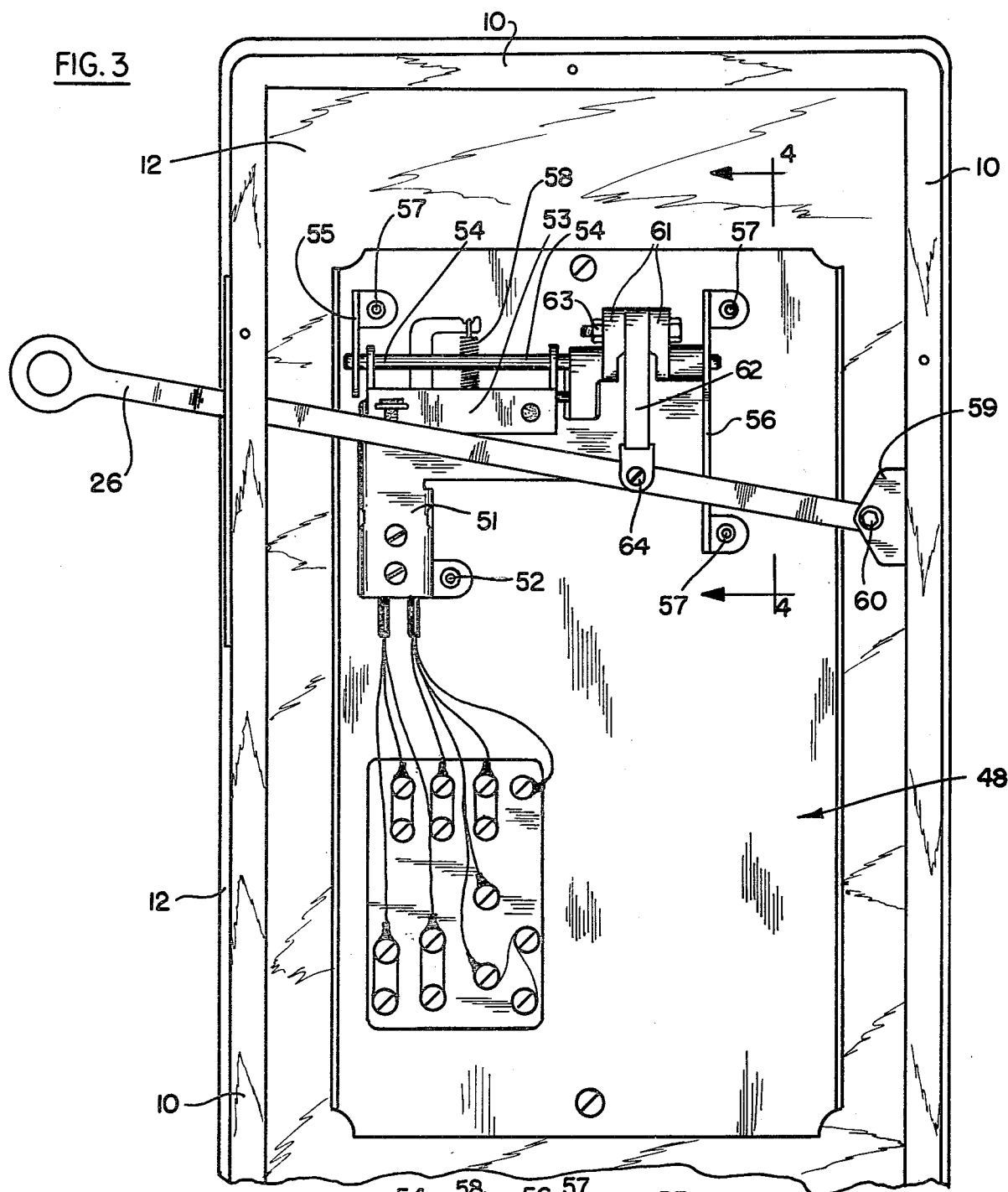
FIG. 3 shows the telephone of FIG. 1, with its cover in an open position to reveal the components of a modern telephone which are mounted in the housing, and which includes a switch connected to the receiver hook by a mechanical linkage in accordance with the invention.

The electrical components 48 of a modern telephone are mounted in the housing as shown in FIG. 3, and the electrical components are connected to the transmitter 20 and to receiver 24 by appropriate electrical connections, not shown. Also, the electrical components 48 are connected through appropriate electrical connections to the Touch-Tone unit 40, or its equivalent.

Figure 4:
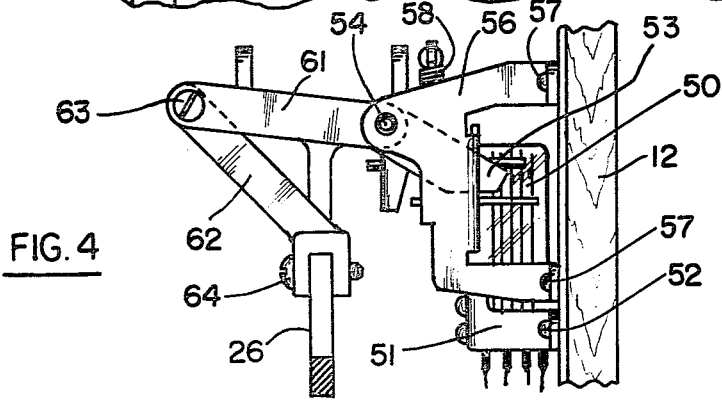
FIG. 4 is a fragmentary section, taken along the line 4—4 of FIG. 3.

The components 48 include switching contacts 50 (FIG. 4) which are operated to activate the telephone. The switching contacts are mounted in a housing 51 which, in turn, is mounted on the housing by rivets, such as rivet 52. The switch contacts are operated by a bracket 53 which is keyed to a bar 54; the bar being rotatably supported in brackets 55, 56 which are mounted on the housing by rivets 57. The bracket 53 is moved to a switch-engaging position by a spring 58 for one angular position of bar 54, and is caused to disengage the switching contacts 50 when the bar 54 is turned to a second angular position against the bias of spring 58. All of the foregoing components are included in the usual present-day telephone.

In accordance with the invention, the bar 54 is coupled to hook 26 by a simple linkage, the hook being pivotally coupled to a bracket 59 by a pin 60. Bracket 59 is mounted on the inner surface of one side of housing 10.

The aforesaid linkage includes a yoke 61 which is keyed to bar 54, and a link 62. Link 62 is coupled to yoke 61 by a pin 63 for angular movement about a first horizontal axis; and the link is coupled to hook 26 by a pin 64 for angular movement about a second horizontal axis perpendicular to the first horizontal axis.

By means of the simple linkage described above, when the receiver 24 is placed on hook 26, bar 54 turns to its first angular position to cause the switching contact 50 to be disengaged. However, when the receiver 24 is removed from hook 26, spring 58 turns the bar 54 to its second angular position in which bracket 53 engages the switch contact 50 to activate the telephone.

The electrical components on the set base 48, and in the transmitter housing 20 and receiver 24, are connected to a cord 66 which is plugged into the telephone line by a usual plug 68.

The invention provides, therefore, a telephone which in no way departs from the appearance of the old-fashioned telephone, as represented in FIG. 1. Yet the telephone of the invention is capable of modern operation, and calls may be made, merely by turning down the shelf 34 to make the dial or Touch-Tone control unit 40 accessible. In other respects, the telephone is fully operational as a modern telephone. The telephone may be constructed in an economical manner by installing modern telephone components in the old-fashioned housing and by coupling the switching contacts on the housing to the pivotally mounted receiver hook by a simple and rugged linkage, in accordance with the teaching of the invention.

It will be appreciated that although a particular embodiment of the invention has been shown and described, modifications may be made. It is intended in the following claims to cover the modifications which come within the spirit and scope of the invention.

What is claimed is:

1. In a telephone assembly including a rectangular housing shaped to be mounted on a vertical wall, a rectangular front door hinged to the housing, a transmitter mounted on the front cover, a hook pivotally mounted on the side of the housing for angular movement about a horizontal pivot axis, a receiver shaped to be removably supported by the hook, a switching unit, a rotatably mounted bar adjacent to said switching unit, a bracket keyed to said bar in position to actuate said switching unit when the bar is turned from a first to a second angular position, and resilient means coupled to the bracket for biasing said bar to its first angular position; the combination of: a yoke keyed to said bar and extending radially outwardly therefrom, and a linkage arm coupled to the distal end of the yoke and to an intermediate point on said hook, to cause upward movement of the distal end of the hook to turn the bar from its first to its second angular position.

2. The telephone defined in claim 1, and which includes a first pin means coupling one end of the linkage arm to the distal end of the yoke for angular movement about a first horizontal axis, and a second pin means coupling the other end of the arm to the intermediate point of the hook for angular movement about a second horizontal axis essentially perpendicular to the first horizontal axis.

3. The telephone defined in claim 1, and which includes bells mounted on the cover, and a crank mounted on the opposite side of the housing to said hook switch.

* * * * *